United States Patent [19]

Fombellida

[11] 4,309,866
[45] Jan. 12, 1982

[54] LAYING AND BINDING OPTICAL WAVEGUIDES ONTO A SUPPORT FILAMENT

[75] Inventor: Miguel Fombellida, Ottawa, Canada

[73] Assignee: Northern Telecom Limited, Montreal, Canada

[21] Appl. No.: 208,565

[22] Filed: Nov. 20, 1980

[51] Int. Cl.³ .................... B65H 77/00; B65H 81/06; B65H 81/08
[52] U.S. Cl. ........................................ 57/15; 57/16; 57/352
[58] Field of Search ............................. 57/3, 6, 9–11, 57/12, 13, 15, 16, 17, 18, 249, 279, 293, 352, 361, 31

[56] References Cited

U.S. PATENT DOCUMENTS

| 4,154,049 | 5/1979 | King et al. | 57/9 |
| 4,156,624 | 5/1979 | Vecchis et al. | 57/13 X |
| 4,195,468 | 4/1980 | King et al. | 57/293 X |
| 4,205,899 | 6/1980 | King et al. | 57/9 X |
| 4,224,787 | 9/1980 | Jackson et al. | 57/15 |
| 4,237,687 | 12/1980 | Vecchis et al. | 57/13 X |

*Primary Examiner*—Donald Watkins
*Attorney, Agent, or Firm*—R. J. Austin

[57] ABSTRACT

Optical waveguide laying and binding apparatus having a binding station for a spool to wrap binding tape around an assembly of waveguides on a support filament. Replacement spools located in a replacement station are movable into the binding station by enabling a waveguide laying structure to be disassembled and moved out of the path of the replacement spool without interfering with the positioning of the waveguides as they are being fed towards the support filament.

5 Claims, 3 Drawing Figures

LAYING AND BINDING OPTICAL WAVEGUIDES ONTO A SUPPORT FILAMENT

This invention relates to laying and binding optical waveguides onto support filaments.

Methods of laying optical waveguides onto support filaments have been suggested. In one method, the support filament and the waveguides are fed along separate feed paths and through a laying unit the purpose of which is to guide the waveguides and assemble them into grooves of the filament. Before the assembly is subjected to a further processing step, it is convenient to pass it through a binding station to helically wrap a binding tape around the assembly sufficient only to retain the waveguides in the grooves.

The binding tape may be supplied by a spool mounted upon a structure outwardly from the waveguides and filament assembly, the structure rotating to drive the spool around a circular path around the assembly as the tape is wrapped onto the assembly. Problems with such an arrangement are associated with the size and space utilization of the equipment and the inertial effects of the structure and loaded spool rotating at a large radius. These problems may be minimized in a different arrangement in which the loaded spool is substantially concentrically mounted with the waveguide and filament assembly, i.e. with the assembly passing through the spool. With this arrangement, the need to drive the spool at large radius around the assembly is avoided. Instead, a simple mechanism is required to guide the binder tape from the spool and wrap it around the waveguide and filament assembly.

While the arrangement with the spool concentric with the waveguide and filament assembly has advantages which enable a more compact apparatus to be provided, there is, however, one main disadvantage. This is that the length of continuous production of assembled waveguides and filament is limited by the amount of binding tape on a spool, for to replace the spool requires the severing of both the waveguide and filament. One way of extending the length of continuous production which may be considered is to place one or more replacement spools in the binding station for use when a previous spool runs out. The spools would need to be mounted upon a cantilever shaft mounted upon bearings. This shaft would form a driving arrangement for supplying tape onto the waveguide and filament assembly. The replacement spools would raise problems in that the weight of the spools would place undue lateral and twisting strain upon the drive means and the bearings.

According to the present invention, an optical waveguide laying and binding apparatus for laying at least one waveguide onto a support filament has a lay station to feed and assemble a waveguide onto filament, a binding station downstream from the lay station along a feed path of assembled waveguide and filament to wrap binding tape around the assembly of waveguide and filament, and a replacement spool station upstream from the lay station along feed paths of waveguide and filament, the apparatus comprising:

a binding unit in the binding station to be supplied with a spool of binding tape from upstream and support the spool with the assembly feed path passing through the spool;

replacement spool support means in the replacement spool station to support at least one replacement spool with the separate feed paths passing through the replacement spool; and a waveguide laying structure comprising an annular laying unit and a holding means detachably connectable to the laying unit in the lay station to retain the laying unit in an operational position surrounding the filament feed path and for guiding the waveguide onto the filament, the holding means movable away from the laying unit and the feed paths while the laying unit is supported by the core, to create a path for movement of a replacement spool along the feed paths from the replacement spool station, through the lay station in which the laying unit passes through the replacement spool, and into the binding station.

In the above defined apparatus according to the invention, the holding means may be completely detachable to allow for movement of the replacement spool. However, it is preferable that the holding means is detachable from the laying unit while still being retained upon the apparatus. One convenient way of retaining the holding means is for it to be hinged for pivotal movement, and a means for locating the holding means in position is provided when it is holding the laying unit in its operational position.

One embodiment will now be described by way of example with reference to the accompanying drawings in which.

Figure 1:
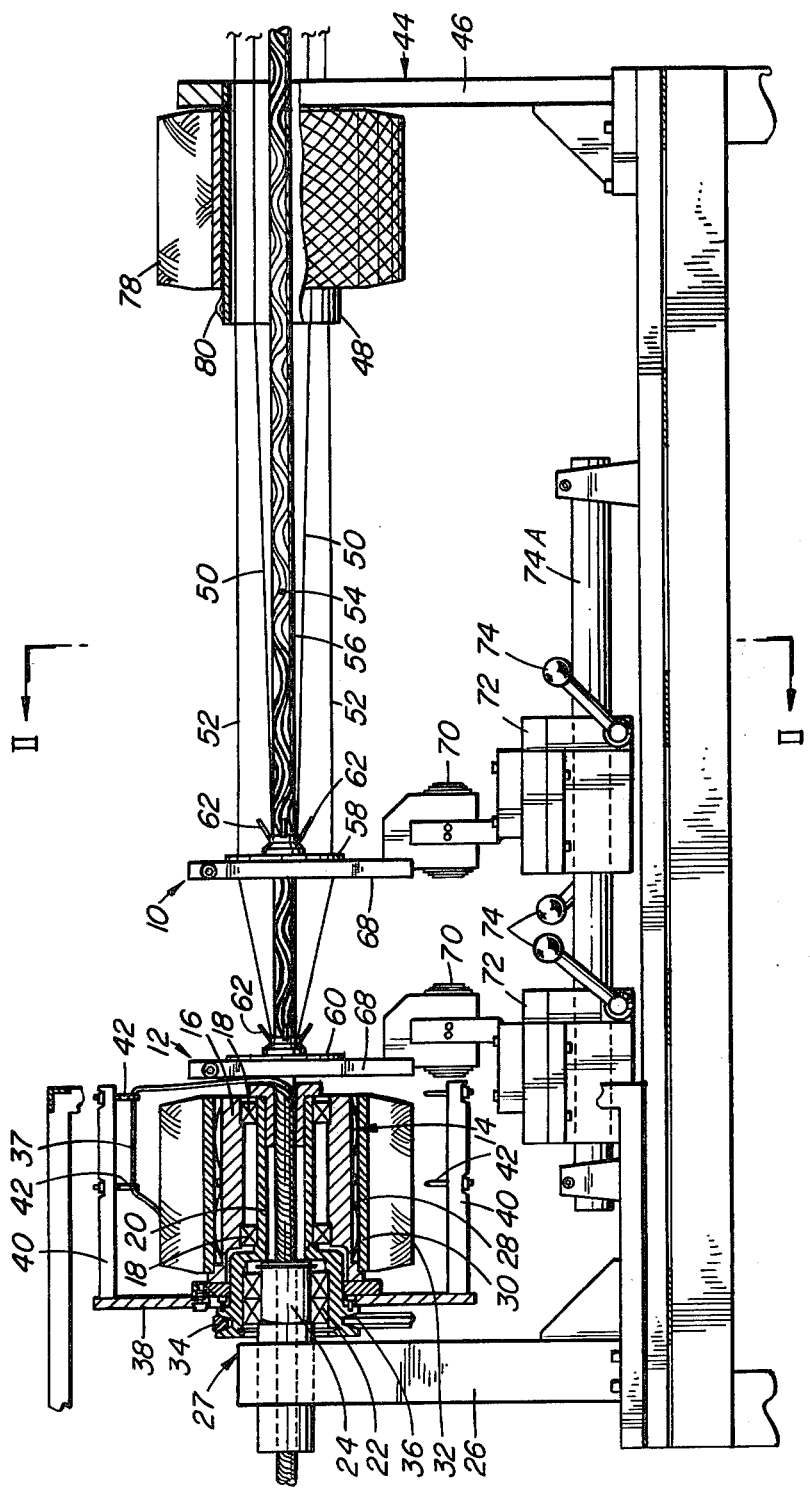
FIG. 1 is a side elevational view, partly in section, of apparatus for laying optical waveguides onto a support filament during optical cable manufacture.

As shown in FIG. 1, apparatus for laying optical waveguides onto an extruded plastics support filament during optical cable manufacture comprises two waveguide laying structures 10 and 12 disposed in tandem along a feed path for the waveguides and filament in a lay station.

Downstream along the feed path from the lay station is a binding unit 14 in a binding station. The binding unit 14 comprises a hollow support shaft 16 freely rotatably mounted by bearings 18 upon an inner support shaft 20, in turn rotatably mounted at a downstream end by bearings 22 upon a short hollow support spindle 24 secured to a vertical frame member 26. The spindle 24 forms the upstream end for apparatus 27 for directing a fluid stream along the core to reposition waveguides on the filament, the apparatus 27 being as described in prior application Ser. No. 025,833, now U.S. Pat. No. 4,248,035 (Canada Pat. No. 324,574) filed Apr. 2, 1979 by R. P. Skillen and F. D. King and entitled "Apparatus and Method Used in the Assembly of Fibre Optic Cables". The outer surface of the shaft 16 has a series of circumferentially spaced leaf springs 28 secured thereto. The springs extend axially of the shaft and are for gripping against the inner surface of the reel 30 of a spool 32 located upon the shaft. The shaft 20 is rotatable by a drive belt 34 passing around a grooved pulley region 36 of the shaft to drive a guide for feeding binding tape 37 from the spool and wrapping it around a waveguide and filament assembly as this passes into the spindle 20 before passing through the apparatus 27. The guide means comprises a radial support 38 having axial arms 40 carrying apertured guide pins 42 which rotate around the spool to pass the binding tape through the apertures and wrap it around the waveguide and filament assembly after it has passed the structure 12. Such guide means are known in practice and will be described no further.

Upstream along the feed path from the lay station is a replacement spool support means 44. This comprises a vertical frame member 46 carrying a horizontal tube 48 extending downstream in a position surrounding the feed paths of the waveguides and filament to be passed through the apparatus. The tube 48 is of sufficient axial length to support one or more replacement spools of binding tape, dependent upon choice.

Figure 2:
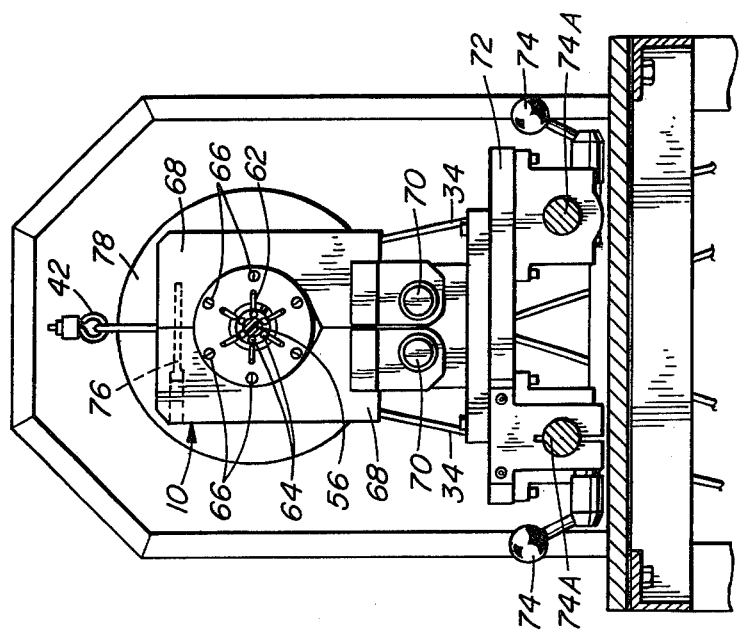
FIG. 2 is a section taken along line II—II in FIG. 1 showing a waveguide laying structure.

The two structures 10 and 12 in the lay station are provided, respectively, for feeding electrical conductors 50 and optical waveguides 52 into sinusoidal grooves 54 formed in extruded plastics filament 56. This is according to the manner described in an application Ser. No. 208,567, entitled "Laying Optical Waveguides and Electrical Conductors Onto a Support Filament" and filed by Tomasz Stanislaw Hope, concurrently with this present application. The structure 10 is provided with a waveguide laying unit 58 which has means to limit the twist of the core as it is fed through the unit so as to prevent entanglement of waveguides as they pass along to the unit station. This limiting means is of the consruction described in an application Ser. No. 208,838, entitled "Control of Support Filament For Optical Waveguides" filed by Tomasz Stanislaw Hope and Miguel Fombellida, concurrently with this application. The laying unit 58 is slightly different in construction from laying unit 60 of structure 12 which latter unit is devoid of limiting means. However, both units are basically of the construction described in U.S. Pat. Ser. No. 4,195,468, issued Apr. 1, 1980 in the name of F. D. King and entitled "Method and Apparatus for Use in the Assembly of Optical Cables", and each comprises needles 62 for guiding waveguides or electrical conductors, as the case may be, onto the filament after passage of the waveguides or conductors through holes, such as holes 64 in the unit 58 (FIG. 2). The unit 58 is also provided with an outer circle of holes 66 for guiding optical waveguides through to the unit 60. Apart from the above differences, the structures 10 and 12 are of the same construction. Conveniently, one structure only will be described, i.e. structure 10, and like reference numerals apply to both structures in FIG. 1.

Figure 3:
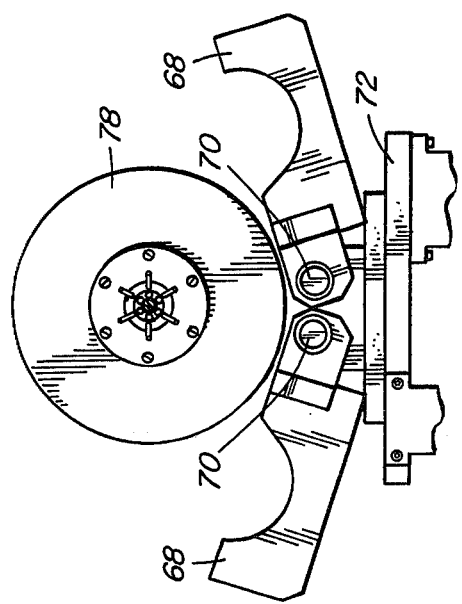
FIG. 3 is a section similar to FIG. 2 showing the laying structure during movement of a replacement spool into a binding station.

The structure 10 comprises holding means for the laying unit 58, the holding means comprising two parts of yokes 68 as shown in FIGS. 2 and 3. The yokes are each hinged at a lower end by hinge pin 70 to a platform structure 72 slidably mounted upon two parallel horizontal bars 74 for adjusting the position of the structure along the feed path of the filament 56 as may be desired. A locking lever 74 is provided for locking the platform to each bar and to release it when adjustment is required.

The two yokes are normally in a position closed together, as shown in FIG. 2, in which they close around, one on each side of, and grip the unit 58 to hold it in an operational position surrounding the filament while it guides the electrical conductors 50 into grooves 54. The yokes are held closed by locking means comprising a screw 76 which secures the upper ends of the yokes together, the laying head lying intermediate the screw and hinge pin 70.

Hence in use, and before the waveguide and filaments are passed into the apparatus, the spool 32 is put into position upon the shaft 16 and the required number of replacement spools 78 are located upon the tube 48. They may be held upon the tube by any convenient holding device which may be a spring 80 at the end of the tube to prevent inadvertent spool removal.

With the yokes of the structures 10, 12 closed as in FIG. 2, the core 56 is fed through tube 48 and through units 58 and 60. The electrical conductors 50 and optical waveguides 52 also pass through the tube 48 and to their respective laying units in which they are laid in their respective grooves 54. In FIG. 1, only the upper and lower conductors and waveguides are shown for purposes of clarity. The assembly 82 of core, conductors and waveguides is bound with tape 37 and passes through the spindle 20 and apparatus 27.

When the spool 32 is completely used, the apparatus is stopped and the reel 30 is removed by breaking or cutting it. Clearly for this purpose, this and other reels should be made from easily tearable and severable material such as thin plastic or cardboard. The screw 76 of each structure 10, 12 is removed and the yokes are pivoted down to the positions shown in FIG. 3 to allow a first replacement spool 78 to be moved manually along the apparatus and over the filament waveguides and conductors, and over each of the laying units to locate it on the shaft 16. With the replacement spool on the shaft 16, the yokes are closed once again, and the apparatus is restarted.

There is no need to cause a break in the filament conductors and waveguides until all of the binding tape upon all of the spools has been used. Clearly, therefore, the above construction allows for the production of exceedingly long lengths of optical cable without breakage by enabling replacement spools to be used by their movement along the cable components and through the lay station.

What is claimed is:

1. An optical waveguide laying and binding apparatus for laying at least one waveguide onto a support filament having a lay station to feed and assemble a waveguide onto filament, a binding station downstream from the lay station along a feed path of assembled waveguide and filament to wrap binding tape around the assembly of waveguide and filament, and a replacement spool station upstream from the lay station along feed paths of waveguide and filament, the apparatus comprising:

a binding unit in the binding station to be supplied with a spool of binding tape from upstream and support the spool with the asembly feed path passing through the spool;

replacement spool support means in the replacement spool station to support at least one replacement spool with the separate feed paths passing through the replacement spool; and a waveguide laying structure comprising an annular laying unit and a holding means detachably connectable to the laying unit in the lay station to retain the laying unit in an operational position surrounding the filament feed path and for guiding the waveguide onto the filament, the holding means movable away from the laying unit and the feed paths while the laying unit is supported by the core, to create a path for movement of a replacement spool along the feed paths from the replacement spool station, through the lay station in which the laying unit passes through the replacement spool, and into the binding station.

2. Apparatus according to claim 1 wherein the holding means is movable towards and away from the laying unit while being retained attached to the apparatus.

3. Apparatus according to claim 2 wherein the holding means is pivotably mounted upon part of the apparatus, and means is provided for locking the holding means in position when it is holding the laying unit in its operational position.

4. Apparatus according to claim 3 wherein the holding means comprises two parts, each of which is hinged, the two parts being disposed one on each side of the laying unit, gripping the laying unit between them to hold it in its operational position and being pivotal away from the laying unit to create a path for movement of a replacement spool.

5. Apparatus according to claim 4 wherein the locking means comprises a screw which secures together the parts of the holding means with the laying unit lying intermediate the screw and the pivotal mounting of the parts of the holding means.

* * * * *